United States Patent Office 3,491,163
Patented Jan. 20, 1970

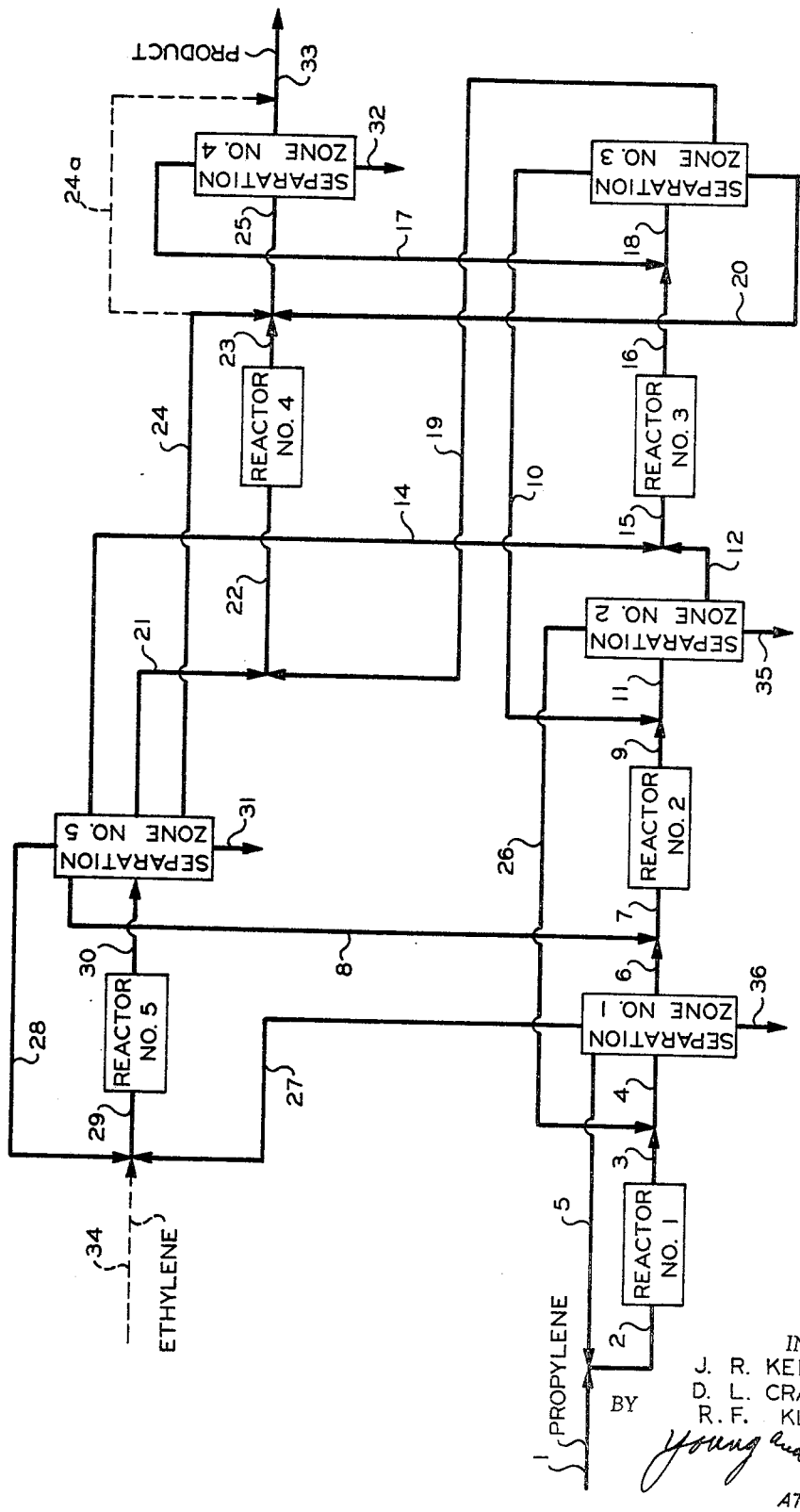

3,491,163
PREPARATION OF LONG CHAIN
LINEAR OLEFINS
Joseph R. Kenton, Donald L. Crain, and Roger F. Kleinschmidt, Bartlesville, Okla., assignors to Phillips Petroleum Company, a corporation of Delaware
Filed July 17, 1967, Ser. No. 653,956
Int. Cl. C07c *3/62, 3/10*
U.S. Cl. 260—683   5 Claims

ABSTRACT OF THE DISCLOSURE

Linear olefins are converted into longer chain linear olefins by contact with a disproportionation catalyst in a series of olefin reaction stages with prompt removal of branched dimer by-products from the effluent of each stage. By-product ethylene can be oligomerized in an "ethylene growth" process and the resulting linear olefins produced in the process are returned to the series of olefin reaction stages.

---

This invention relates to a method for converting linear olefins into higher molecular weight linear olefins. This invention also relates to the olefin process wherein linear olefins are converted into higher molecular weight linear olefins by contacting the linear olefins with an olefin disproportionation catalyst in the olefin process. In one of its more specific aspects this invention relates to a method for converting propylene into ethylene and linear olefins containing from 11 to 15 carbon atoms per molecule by the olefin process and oligomerizing the by-product ethylene into additional higher molecular weight linear olefins.

The olefin reaction is defined as a process for the catalytic conversion over a solid catalyst of feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third an fourth carbon atoms can be in the same or different molecules.

The olefin reaction according to this invention is illustrated by, among others, the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acrylic mono- or polyene having three or more carbon atoms and a different acyclic mono- or polyene having three or more carbon atoms to produce different acyclic olefins; for example, the conversion of propylene and 1-butene yields ethylene and 2-pentene.

According to the present invention, linear olefins are converted to higher molecular weight linear olefins of both the internal and terminal type in a closely integrated combination of steps wherein the linear oelfins are contacted with a disproportionation catalyst in a series of olefin reaction zones. In one embodiment, the ethylene which is produced as a by-product of the olefin reaction is passed to an "ethylene growth" process wherein the ethylene is oligomerized to higher molecular weight linear olefins which are returned to the series of olefin reaction zones. It is a feature of this invention that the branched chain dimers produced as a by-product in the olefin reaction zones are removed promptly from the effluent of each olefin reaction step so as to minimize, as much as is practical, the carryover of such branched materials from one reaction zone to another.

Recent developments in olefin disproportionation catalysts have improved the specificity of the olefin disproportionation catalyst so that smaller amounts of dimeric by-products are produced. For example, it has been found that the addition of alkali or alkaline earth metal bases or salts to such catalysts improves the selectivity to the desired olefin reaction products but sometimes at some expense to the overall activity of the catalyst. However, even these catalysts of improved selectivity produce sufficient dimeric by-products to cause difficulty in a process to produce long chain linear oleins. It has been found that even relatively small amounts of polymerization products, in most cases these are dimerization products, have a serious effect which is far out of proportion to the small amounts present on the efficiency and success of such a process. Part of the reason for this is because it is practically impossible to resolve a mixture of both linear and branched olefins by ordinary means such as distillation if such mixture covers a range of such olefins such as one containing from 11 to 15 carbon atoms per molecule. However, it is speculated that the main reason is the rapid build-up of branched by-products. When a dimer product, which is a branched olefin, is formed and passed in succession from one olefin reaction zone to another, it apparently continues to react to form other larger branched olefins or alkylates of the branched material with a linear olefin and thus consumes feed olefins which might otherwise have been converted to the desirable linear olefin product. Thus, a given quantity of branched dimeric by-products, if allowed to remain in the process beyond the first disproportionation stage, can frequently be multiplied up to fifteen fold and more after several additional stages. Because of this, it is of particular importance to promptly remove these branched materials from the process after at least each of the first few disproportionation stages. Branched materials formed in the last stages are of slightly less concern because they have much smaller opportunity to react with and consume linear materials.

Linear olefins containing from about 10 to 16 carbon atoms per molecule are valuable for the production of detergent alkylates and it is essential that these olefin mixtures contain a minimum of branched olefins so that the detergent ultimately produced is substantially biodegradable. Olefins of this molecular weight range can be conveniently and economically prepared from a readily available olefin such as propylene using a series of olefin disproportionation stages. The present method now provides a means for producing long chain linear olefins having a satisfactorily low concentration of branched chain olefins. For example, propylene can be converted in high yield to detergent alkylate range olefins having a branched olefin content of about 3 weight percent or less. In contrast, branched olefin contents of 6–30 percent might otherwise be expected depending upon specific catalysts and conditions utilized.

It is an object of the present invention to provide a process for producing long chain linear olefins utilizing the olefin reaction process. Another object is to provide a method for producing long chain linear olefins by a combination of the olefin reaction process and the ethylene growth process. Other aspects, objects and advantages of the present invention will become apparent to one skilled in the art upon a study of this disclosure including the detailed description of the invention and the drawing wherein:

The sole figure is a schematic flow diagram of a preferred embodiment of the present invention.

The catalysts which are useful for the present invention are those which have activity for the disproportionation of propylene into ethylene and butenes. Some examples of such catalyst are:

(1) Silica or thoria promoted by an oxide or compound convertible to an oxide by calcination, or sulfide of tungsten or molybdenum or by an oxide or compound convertible to an oxide by calcination of rhenium, vanadium, niobium, tellurium or tantalum;

(2) Alumina promoted with an oxide or compound convertible to an oxide by calcination of molybdenum, tungsten, or rhenium; a sulfide of tungsten or molybdenum; or an alkali metal salt, ammonia salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or an oxide of molybdenum, tungsten, vanadium, niobium, tantalum or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried and heated as above to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the supported material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as alumina with a solution of the hexacarbonyl of the promoter in an organic solvent such as benzene, followed by drying in a vacuum or in an inert atmosphere at about 50 to 700° F.

Olefin disproportionation catalysts such as the above-described can be treated with small amounts of inorganic bases. For example, the specificity of catalysts such as the alumina-supported molybdenum oxide or the silica-supported tungsten oxide can be improved by the addition of about 0.1–1.0 weight percent of materials such as NaOH, KOH, $K_2CO_2$, and the like.

The catalytic agent is considered to be the reaction product resulting from the admixture of the support material and the promoter material which is subjected to activation treatment.

It is frequently advantageous to include an olefin isomerization catalyst in some of the olefin disproportionation stages. For example, catalysts such as MgO, ZnO, and the like which are active double bond isomerization catalysts, can be utilized in combination with an olefin disproportionation catalyst. A bed of isomerization catalyst can precede the disproportionation catalyst or a mixed bed containing an intimate blend of such catalysts can be employed.

The operating temperature for the olefin reaction stages of the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to about 2000 p.s.i.g.

Other catalyst include those disclosed in Ser. No. 412,343 filed Nov. 19, 1964, now Patent No. 3,395,196; Ser. No. 517,918 filed Jan. 3, 1966, now Patent No. 3,442,969; Ser. No. 517,905 filed Jan. 3, 1966, now Patent No. 3,444,262; Ser. No. 421,692 filed Dec. 28, 1964; Ser. No. 529,230 filed Feb. 23, 1966; Ser. No. 516,673 filed Dec. 27, 1965; Ser. No. 627,634 filed Apr. 3, 1967; Ser. No. 627,636 filed Apr. 3, 1967; and U.S. Patent 3,261,879 issued July 19, 1966.

Olefins applicable as feed materials in the process of the invention are linear olefins having at least three carbon atoms per molecule. Particularly useful are linear olefins having from 3 to 8 carbon atoms per molecule. Some specific examples of linear olefins particularly suitable for reactions of this invention include propylene, 1-butene, 2-butene, 1-pentene, 2-pentene, 1-hexene, 3-hexene, 2-heptene, 3-octene and 1-octene, and the like, and mixtures thereof.

According to the olefin reaction process of this invention, the olefin is contacted with the disproportionation catalyst at a temperature of from about 0 to about 1200° F., depending on the olefin and the catalyst employed. The pressure can vary from 0 to about 2000 p.s.i.g. and the reaction time will be in the range of about 0.1 second to 10 hours, depending upon the feed, the catalyst, and the desired degree of conversion.

By-product ethylene can be oligomerized to produce higher molecular weight, straight chain 1-olefins by contacting the ethylene with catalysts such as trialkylaluminum ($AlR_3$) at suitable operating conditions. The oligomerization reaction can be conducted continuously by maintaining suitable conditions including the proper mole ratio of olefin to aluminum alkyl and conditions of temperature, pressure, etc., such that the higher boiling olefins are continuously produced. This process is generally known as the "ethylene growth" process. The conventionally known one-step ethylene growth process is the presently favored form of this process and can be carried out at a temperature in the range of about 175 to 260° C.; at pressures in the range of about 300 to 10,000 p.s.i.g.; and at an ethylene-to-catalyst ratio in the range of about 20 to 1500 by weight. Conversion will be maintained in the range of about 40 to 70 percent and residence time will be from 0.01 to 6 hours. Low conversion values and low residence time values are conductive to low concentrations of branched chain olefins in the product. The catalyst can be removed from the reaction effluent by contact with an excess of aqueous mineral acid to destroy the organoaluminum after which the organic phase is separated, dried and passed on to separation stages.

Inert solvents or diluents such as saturated acylic and cyclic hydrocarbons can be used in the ethylene growth process as well as in the olefin reaction process if such solvents are desired. It is ordinarily preferred, however, to operate without the presence of a diluent.

Referring now to the drawing, propylene is passed via conduits 1 and 2 to reactor 1 which contains therein a disproportionation catalyst such as tungsten oxide on a silica support. The effluent from reactor 1, comprising $C_2$ through $C_4$ olefins and a small amount of heavier material including the branched dimer of propylene, is passed via conduits 3 and 4 to separation zone 1 from whence materials heavier than $C_4$ olefins are rejected via conduit 36, ethylene is removed via conduit 27, propylene is recycled to conduit 2 via conduit 5, and butenes are passed via conduits 6 and 7 to reactor 2 which contains therein a mixture of an isomerization catalyst and a disproportionation catalyst. The effluent from reactor 2, which contains $C_2$ olefins through $C_6$ olefins as well as branched dimers of $C_4$ olefins and heavier, is removed via conduits 9 and 11 and passed to separation zone 2 from whence $C_7$ olefins and heavier are rejected via conduct 35, butenes and lighter olefins are passed via conduit 26 to conduit 4 and $C_5$ and $C_6$ olefins are passed via conduits 12 and 15 to reactor 3 containing therein a mixture of an isomerization catalyst and a disproportionation catalyst similar to the catalyst in reactor 2. The effluent from reactor 3, containing olefins ranging up to $C_{16}$ and heavier, is removed via conduits 16 and 18 and passed to separation zone 3 from whence $C_6$ and lighter olefins are removed via conduit 10 and passed to conduit 11, $C_7$ to $C_{10}$ olefins are passed via conduit 19 to conduit 22, and $C_{11}$ olefins and heavier are passed via conduit 20 to conduit 23. The $C_7$ to $C_{10}$ olefins are passed via conduit 22 to reactor 4 containing a mixture of catalysts similar to that in reactors 2 and 3. The effluent of reactor 4, which contains $C_3$ to $C_{16+}$ olefins is passed via conduits 23 and 25 to separation zone 4 from whence $C_{16}$ olefins and heavier are removed via conduit 32, $C_{10}$ and lighter olefins are passed via conduit 17 to conduit 18, and $C_{11}$ to $C_{15}$ olefins are removed via conduit 33 either as product or as a feed for subsequent disproportionation stages.

Ethylene can be removed from separation zone 1 via conduit 27 as product or can be passed via conduit 29 to reactor 5 which contains an ethylene-growth catalyst such as triethylaluminum. The effluent from reactor 5, containing even numbered linear olefins from $C_2$ to $C_{16+}$ is passed via conduit 30 to separation zone 5 from whence $C_{16}$ olefins and heavier materials are removed via conduit 31 and ethylene is recycled via conduit 28 to conduit 29, and butenes are passed via conduit 8 to conduit 7, $C_6$ olefins are passed via conduit 14 to conduit 15, $C_8$ and $C_{10}$ olefins are passed via conduit 21 to conduit 22, and $C_{12}$ and $C_{14}$ olefins are passed via conduit 24 to conduit 23 or alternatively passed via conduit 24a directly to conduit 33. If desired, additional ethylene can be passed via conduit 34 to conduit 29.

In reactor 1, propylene is disproportionated into butenes and ethylene as the principal reaction.

In reactor 2, butene-1 and pentene-1 can react to form ethylene and 3-heptene; butene-1 and butene-2 can react to form propylene and pentene-2; butene-1 can react with butene-1 to form ethylene and hexene-3; and pentene-1 can react with pentene-1 to form ethylene and octene-4. A number of other similar secondary reactions can also occur so that successively higher and higher molecular weight linear olefins are formed as well as lower molecular weight linear olefins. Simultaneously, some high molecular weight olefins are converted in the presence of ethylene in secondary reactions to form lower molecular weight olefins, for example, dodecene-2 can be converted by ethylene to form undecene-1 and propylene. The presence of the isomerization catalyst greatly multiplies the number of possible reaction combinations which can produce linear products and thus improves the efficiency of the conversions.

In reactors 3 and 4, the feed olefins are converted to still higher molecular weight olefins by reactions analogous to those in reactors 1 and 2. Any lower molecular weight olefins formed are recycled to earlier reaction zones. Ethylene produced in any of the reaction zones is removed or diverted to the ethylene-growth reactor.

It is a feature of the invention that high molecular weight branched-chain olefins are promptly removed after each reaction step or at least after the propylene and butene conversion steps. It has been found that prompt removal of branched-chain olefins prevents the proliferation of branched olefins and permits the production of long-chain linear olefins containing tolerable amounts of branched-chain olefins. The dimers of the linear olefins other than those of ethylene are usually branched-chain olefins.

The figure schematically shows that the undesirable branched materials are rejected from the process in the indicated separation zones. Any conventional separation technique can be used. Ordinarily, fractional distillation is utilized but other conventional techniques such as the removal of branched materials by adsorption through suitable molecular sieves or other adsorbents can also be used.

The following specific example will be helpful in attaining an understanding of this invention; however, it should be understood that the example is for illustrative purposes and should not be construed so as to limit the invention unduly. The example illustrates an embodiment of the invention wherein propylene is converted to detergent alkylate range olefins and wherein the by-product ethylene is utilized in a novel way to provide additional product.

EXAMPLE I

In a system such as illustrated in the drawing, reactor 1 contains disproportionation catalyst comprising 9 percent tungsten oxide on silica. The reactor is operated at 450 p.s.i.g. at 725° F. and at a weight hourly space velocity of 25. Reactor 2 contains a catalyst comprising a mixture of magnesium oxide and the tungsten oxide on silica catalyst as in reactor 1 and reactor 2 is operated at 300 p.s.i.g. at 725° F. and at a weight hourly space velocity of 125. Reactor 3 contains a catalyst as in reactor 2; is operated at 100 p.s.i.g. at 725° F. and a weight hourly space velocity of about 300. Reactor 4 contains a catalyst as in reactors 2 and 3; is operated at about 0 to 15 p.s.i.g. at 725° F. and at about a 300 weight hourly space velocity. Reactor 5 contains a triethylaluminum catalyst at a ratio of about 1 pound of triethylaluminum to 600 pounds of ethylene, and is operated at about 5000 p.s.i.g. and at 450° F.

Table I is the material balance typical of a preferred mode of operation of the system as descirbed above. The column numbers correspond to conduits of the drawing having the same numbers.

ing and yet to maximize the amount of olefins produced having from 6 to 14 carbon atoms per molecule. This step can be modified to produce essentially butenes or

TABLE I

| Olefins, lbs.: | Feed Streams | | | | | | | | | | | | | | | |
|---|---|---|---|---|---|---|---|---|---|---|---|---|---|---|---|---|
| | 1 | 2 | 3 | 4 | 6 | 7 | 9 | 10 | 11 | 12 | 14 | 15 | 16 | 17 | 1 |
| $C_2$ | | | 3.228 | 3.507 | | | 0.279 | | .279 | | | | 1.317 | .324 | 1.641 |
| $C_3$ | 3.600 | 27.710 | 17.909 | 24.110 | | | 4.560 | 1.641 | 6.201 | | | | 3.161 | .370 | 3.531 |
| $C_4$ | | | 6.470 | 21.836 | 21.836 | 23.614 | 11.835 | 3.531 | 15.366 | | | | 2.912 | .643 | 3.555 |
| $C_5$ | | | 0.103 | .103 | | | 5.254 | 3.555 | 8.809 | 8.809 | | 8.809 | 2.577 | .983 | 3.560 |
| $C_6$ | | | | | | | 1.287 | 3.560 | 4.847 | 4.847 | .668 | 5.515 | 1.703 | 1.068 | 2.771 |
| $C_7$ | | | | | | | ¹.399 | | .399 | | | | 1.160 | 1.071 | 2.231 |
| $C_8$ | | | | | | | | | | | | | 0.665 | 1.073 | 1.738 |
| $C_9$ | | | | | | | | | | | | | 0.368 | 1.259 | 1.627 |
| $C_{10}$ | | | | | | | | | | | | | 0.212 | | .212 |
| $C_{11}$ | | | | | | | | | | | | | 0.127 | | .127 |
| $C_{12}$ | | | | | | | | | | | | | 0.058 | | .058 |
| $C_{13}$ | | | | | | | | | | | | | 0.036 | | .036 |
| $C_{14}$ | | | | | | | | | | | | | 0.014 | | .014 |
| $C_{15}$ | | | | | | | | | | | | | 0.014 | | .014 |
| $C_{16}$ | | | | | | | | | | | | | | | |
| Totals | 3.600 | 27.710 | 27.710 | 49.556 | 21.836 | 23.614 | 23.614 | 12.287 | 35.901 | 13.656 | .668 | 14.324 | 14.324 | 6.791 | 21.115 |

| Olefins, lbs.: | Feed Streams | | | | | | | | | | | | | | |
|---|---|---|---|---|---|---|---|---|---|---|---|---|---|---|---|
| | 19 | 20 | 21 | 22 | 23 | 24 | 25 | 26 | 27 | 29 | 30 | 31 | 32 | 33 | 35 | 36 |
| $C_2$ | | | | | | | | .279 | 3.507 | 7.014 | 3.507 | | | | | |
| $C_3$ | | | | | .324 | | .324 | 6.201 | | | | | | | | |
| $C_4$ | | | | | .370 | | .370 | 15.366 | | | | | 1.778 | | | |
| $C_5$ | | | | | .693 | | .643 | | | | | | | | | |
| $C_6$ | | | | | .983 | | .983 | | | | | | .668 | | | ¹.103 |
| $C_7$ | 2.771 | | | 2.771 | 1.068 | | 1.068 | | | | | | | | ¹.339 | |
| $C_8$ | 2.231 | | .445 | 2.676 | 1.071 | | 1.071 | | | | | | .445 | | | |
| $C_9$ | 1.738 | | | 1.738 | 1.073 | | 1.073 | | | | | | | | | |
| $C_{10}$ | 1.627 | | .281 | 1.908 | 1.259 | | 1.254 | | | | | | .281 | | | |
| $C_{11}$ | .212 | | | | .845 | | 1.057 | | | | | | | 1.057 | | |
| $C_{12}$ | .127 | | | | .629 | .164 | .920 | | | | | | .164 | .920 | | |
| $C_{13}$ | .058 | | | | .390 | | .448 | | | | | | | .448 | | |
| $C_{14}$ | .036 | | | | .222 | .100 | .358 | | | | | | .100 | .358 | | |
| $C_{15}$ | .014 | | | | .118 | | .132 | | | | | | | .132 | | |
| $C_{16}$ | .014 | | | | .097 | | .111 | | | | .071 | .071 | .111 | | | |
| Totals | 8.367 | .461 | .726 | 9.093 | 9.092 | .264 | 9.817 | 21.846 | 3.507 | 7.014 | 7.014 | .071 | .111 | 2.915 | .339 | .103 |

¹ Includes heavier olefins.

The above material balance illustrates a preferred mode of operation in combining an olefin reaction process with a one-step ethylene growth process including the feature of prompt removal of branched chain olefins so as to produce high molecular weight linear olefins suitable for detergent alkylates. The principal reaction of the olefin reaction process is that of disproportionation, for example, propylene is disproportionated to ethylene and butenes and butene-1 is disproportionated to ethylene and hexenes, etc. As shown in the drawing, all of the ethylene from the disproportionation steps is oligomerized to butenes, hexenes, octenes, etc. The 1-olefins produced are then returned to the olefin reaction process and disproportionated to more ethylene and higher linear olefins such as $C_{11}$–$C_{15}$ olefins. The final product range of linear olefins is the range of olefins useful in preparing biodegradable detergents. Thus, as shown in the material balance and in the drawing, the process converts propylene to high molecular weight linear olefins with no by-product ethylene.

The example shown above illustrates the unique advantages resulting from the integrated combinations of an ethylene growth process and a series of olefin reaction stages, particularly when higher molecular weight linear olefins are desired. These two processes have been found to complement each other to a remarkable degree. A major by-product of the olefin reaction sequence is ethylene, which has been found easily convertible to linear oligomers via the growth process. The growth process, on the other hand, suffers from a lack of selectivity in that a broad distribution of oligomers is generally produced. However, this deficiency has been overcome. The oligomers not in the product range are, because they are linear, ideally suited to be returned to the olefin reaction sequence of stages.

The ethylene growth portion of the process is operated so as to minimize the formation of olefins having 16 carbon atoms and more per molecule as well as branching and yet to maximize the amount of olefins produced having from 6 to 14 carbon atoms per molecule. This step can be modified to produce essentially butenes or to increase greatly the amount of product having from 6 to 14 carbon atoms per molecule. The drawing shows the olefin product containing from 12 to 14 carbon atoms per molecule as entering the process via conduit 24 between reactor 4 and separation zone 4. These products can be passed through conduit 24a and blended with the product in conduit 33 which contains linear olefins having from 11 to 15 carbon atoms per molecule. It may also be advantageous to increase the output of the ethylene growth step by introducing an external source of ethylene via conduit 34. Aluminum alkyls normally present in the effluent of reactor 5 are removed in separation zone 5 by conventional means such as hydrolysis, preferably with sulfuric acid followed by a drying step. Since these steps are conventional, they are not shown separately. In order to keep the drawing as simple as possible, means for additional catalyst introduction to reactor 5 and means for regeneration of catalyst in reactors 1, 2, 3, and 4 have not been shown; however, these means are well known and will readily be understood by those skilled in the art. Furthermore, various valves, pumps, and other items necessary for the operation of such process are not shown but will readily be recognized as required by those skilled in the art.

From the preceding illustration and teachings, it will be obvious to one skilled in the art that the present invention is capable of many variations within its scope. For example, the number of disproportionation stages can be varied depending upon the products desired. A single stage can accommodate either an olefin of a single carbon number or a group of olefins of different carbon number. Moreover, the feed material need not be limited to a single olefin. One or more olefins can be fed into the process at any appropriate point. For example, the process illustrated in the example can be operated by feeding butenes into reactor 2, pentenes into reactor 3, heptenes into reactor 4, or ethylene into reactor 5 either in addition to or instead of the propylene feed into reactor 1.

In another variation, for example, pentenes can be converted to detergent alkylate range olefins in a three-stage process, feeding pentenes to the first, hexenes and heptenes to the second, and octenes and higher to the third, while removing butenes and lighter from the process.

Similarly, combinations of different catalysts can be used in the process. For example, the more selective base-treated catalysts can be used to contact those olefins which are more prone to dimerization or where separation of the branched dimer by-products is particularly difficult, while conventional non-base-treated catalysts can be used in other stages.

The present invention is, similarly, not limited to any particular separation apparatus, separation process, or sequence of separation stages. Any conventional means can be employed for carrying out the indicated separations and recoveries.

That which is claimed is:

1. A process for converting a linear, acyclic feed olefin into a higher molecular weight linear, acyclic olefin which comprises
   (1) contacting a linear, acyclic feed olefin with a first disproportionation catalyst in a first reaction zone under conditions to produce a disproportionation product olefin lighter than said feed olefin, a disproportionation product olefin heavier than said feed olefin, and branched olefins heavier than said disproportionation olefin products;
   (2) removing the branched olefins from the system;
   (3) returning linear olefins of the same molecular weight as said feed olefins to said first reaction zone;
   (4) contacting said disproportionation product olefin heavier than said feed olefin with successive olefin disproportionation catalysts in successive reaction zones under conditions suitable to produce and separate olefins having both higher and lower numbers of carbon atoms per molecule;
   (5) removing from the system branched olefins from each effluent of the reaction zones; and
   (6) recovering the disproportionation product olefins heavier than the feed olefins from the final reaction zone as the product of the process.

2. The process of claim 1 wherein the feed olefin is propylene and the disproportionation products of the first reaction zone are ethylene and butenes; the olefins heavier than the disproportionation product olefins contain the branched chain dimers of propylene; and the disproportionation product olefins obtained as the product of the process are linear, acyclic olefins containing 11 to 15 carbon atoms per molecule.

3. The process of claim 2 wherein ethylene is contacted with an oligomerization catalyst under conditions suitable to produce a linear oligomer of ethylene.

4. The process of claim 2 wherein the propylene feed olefin is contacted with a disproportionation catalyst comprising tungsten oxide associated with silica; and the disproportionation product olefins are contacted in the successive reaction zones with an olefin disproportionation catalyst comprising a mixture of tungsten oxide associated with silica and magnesium oxide.

5. The process of claim 2 wherein the butenes are contacted with a disproportionation catalyst in a second reaction zone under conditions suitable to produce ethylene and hexenes; heptenes and the heavier olefins are removed from the system; the disproportionation products including hexenes are contacted with an olefin disproportionation catalyst in a third reaction zone under conditions suitable to produce ethylene and decenes; the disproportionation products including decenes are contacted with an olefin disproportionation catalyst in a fourth reaction zone under conditions suitable to produce at least some ethylene and octadecenes; the ethylene from each reaction zone is oligomerized and passed to said second, third and fourth reaction zones; and the effluent of said fourth reaction zone is fractionated to produce a mixture of linear olefins having 11 to 15 carbon atoms.

References Cited

UNITED STATES PATENTS

| | | | |
|---|---|---|---|
| 3,261,879 | 7/1966 | Banks | 260—683 |
| 3,296,330 | 1/1967 | Sherk | 260—683 |

DELBERT E. GANTZ, Primary Examiner

C. E. SPRESSER, Assistant Examiner

U.S. Cl. X.R.

260—671, 683.15